United States Patent [19]

Barlow et al.

[11] Patent Number: 4,764,862
[45] Date of Patent: Aug. 16, 1988

[54] RESILIENT BUS SYSTEM

[75] Inventors: George J. Barlow, Tewksbury, Mass.; James W. Keeley, Hudson, N.H.

[73] Assignee: Honeywell Bull Inc., Waltham, Mass.

[21] Appl. No.: 717,201

[22] Filed: Mar. 28, 1985

Related U.S. Application Data

[63] Continuation-in-part of Ser. No. 623,264, Jun. 21, 1984.

[51] Int. Cl.[4] .................... G06F 13/14; G06F 13/42
[52] U.S. Cl. ............................................ 364/200
[58] Field of Search ... 364/200 MS File, 900 MS File; 371/76

[56] References Cited

U.S. PATENT DOCUMENTS

| | | | |
|---|---|---|---|
| 3,676,860 | 7/1972 | Collier | 364/200 |
| 3,866,181 | 2/1975 | Gayman et al. | 364/200 |
| 3,993,981 | 11/1976 | Cassarino et al. | 364/200 |
| 4,166,211 | 8/1979 | York et al. | 364/200 |
| 4,281,380 | 7/1981 | DeMesa et al. | 364/200 |
| 4,320,452 | 3/1982 | Kempe et al. | 364/200 |
| 4,371,928 | 2/1983 | Barlow | 364/200 |
| 4,386,416 | 5/1983 | Giltner et al. | 364/900 |
| 4,390,944 | 6/1983 | Quackenbush et al. | 364/200 |

Primary Examiner—David Y. Eng
Attorney, Agent, or Firm—Faith F. Driscoll; John S. Solakian

[57] ABSTRACT

A data processing system includes a plurality of units which are coupled to transfer requests including data, command and integrity signals between units over a system bus during allocated bus transfer cycles. Each unit includes response apparatus for acknowledging requests received from other units. Each of a number of units further includes retry apparatus and like checking apparatus for verifying that the different parts of a request received from such unit over the bus are valid based upon the states of accompanying function identification signals. When less than all of the parts of the request defined as requiring verification are detected as valid, the receiving unit does not accept the request and inhibits its response apparatus from generating a response. This prevents damage to system integrity and permits each unit with retry apparatus to retry the request during a subsequent bus transfer cycle.

24 Claims, 8 Drawing Sheets

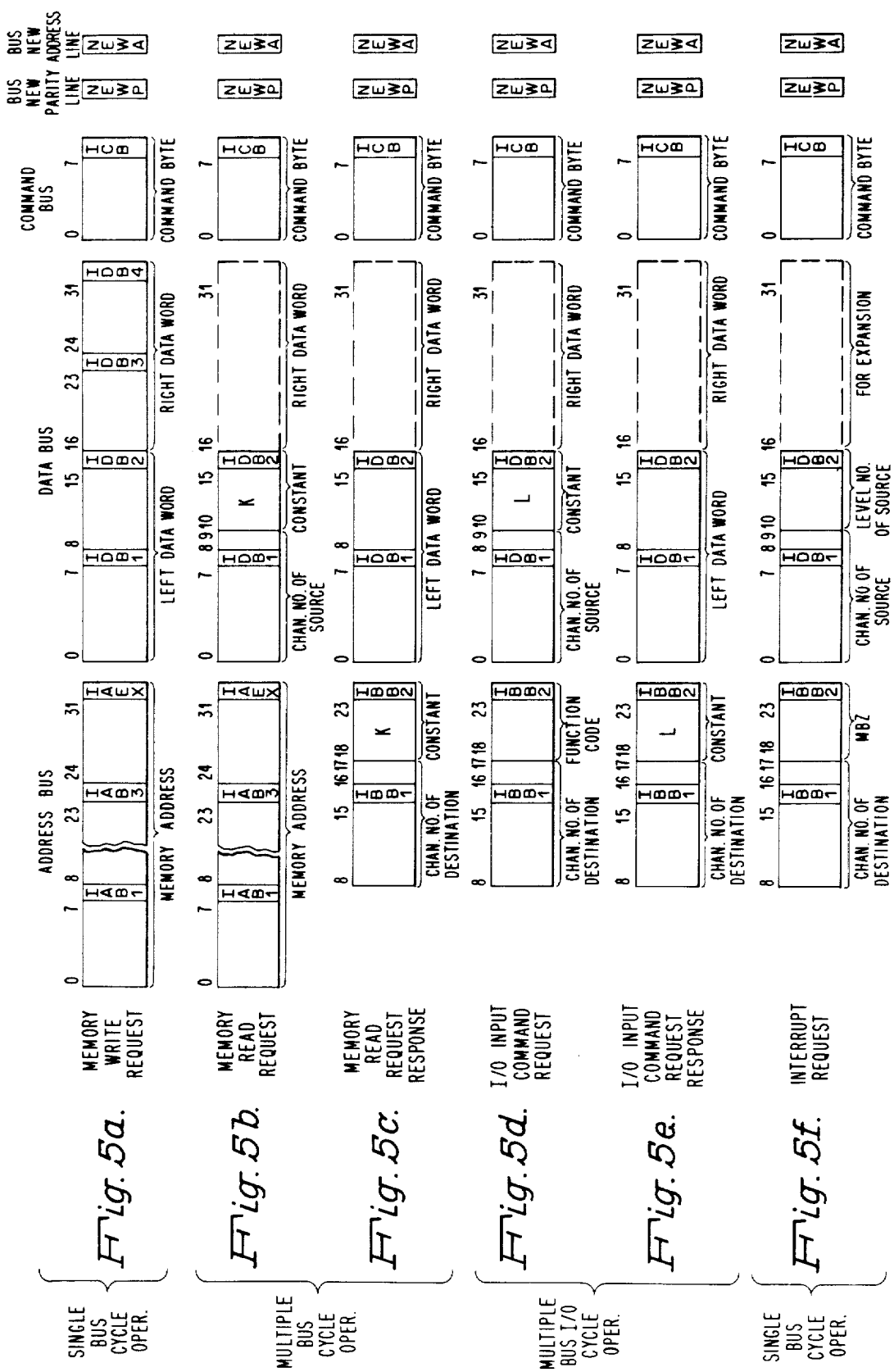

RESILIENT BUS SYSTEM

This is a continuation-in-part of co-pending patent application Ser. No. 06/623,264, filed on June 21, 1984.

BACKGROUND OF THE INVENTION

1. Field of Use

This invention pertains to data processing systems and, more particularly, to apparatus for transmitting and receiving requests over a common bus.

2. Prior Art

There are a variety of methods and apparatuses for interconnecting the different unit controllers of a data processing system for transmitting and receiving requests over a common bus. The transfer of requests proceeds either over synchronous or asynchronous generated bus transfer cycles of operation. U.S. Pat. Nos. 3,676,860 and 3,866,181 are illustrative of such systems.

In some systems, it has been the practice to include itegrity bits in the data portion of a request. These bits are used to verify the correctness of the data following acceptance of the request by a receiving unit.

U.S. Pat. Nos. 3,993,981 and 4,371,928, assigned to the same assignee as named herein, are illustrative of an asynchronous bus system. These systems have units which are coupled in a priority network which is distributed along the system bus. Each unit has response apparatus for responding to a request for a transfer of information from another unit which provides up to three different types of signal responses. Also, each unit, except memory, has comparator circuits for insuring the integrity of the information being transferred over the bus. The master unit compares the channel number portion of each request sent by it to a slave unit during a previous bus cycle with the address channel number received back from the slave unit during a subsequent cycle of operation.

This arrangement only provides a subsequent check for insuring that information was transferred to the unit originating the request. It only indirectly verifies that a request was received by the correct unit. Further, the arrangement contemplates an operating environment in which the units attached to the system bus are not assigned similar channel number addresses and normally only a single memory request is being processed at any given interval of time. However, with the introduction of more efficient techniques of using memory, resulting in simultaneous processing of requests, and an increase in the number of units (e.g. memory controllers, I/O controllers and central processing units) attachable to the system bus, the chance for undetected errors has increased substantially.

The systems disclosed in U.S. Pat. Nos. 3,993,981 and 4,371,928 have provided some additional integrity in addressing a memory controller and its different memory board (i.e., modules). When the memory controller detects having received its address with correct parity and an indication that the module board being addressed has been installed in the system, the controller generates one of three specified responses. If any one of these conditions is not met, the controller does not respond. After a certain period of time, this will generate a time out condition to occur within the system, causing central processing unit to detect an interrupt or trap. Again, the integrity of the system is only insured to the point of correctly addressing the memory controller and preventing the acceptance of a memory request.

This still leaves open the possibility of having good memory data destroyed or incorrect data written into memory. Moreover, by the time the error is detected by the central processing unit, system operation will have progressed to a point where the actual source of the problem cannot be accurately determined. Thus, considerable system processing time has to be expended in processing such error conditions at the operating system software level without any realistic chance for success. The reason for this is that errors caused by the system bus and associated circuits have been observed to manifest themselves as intermittent conditions rather than as solid failures. That is, certain operating conditions often times create metastable, oscillatory or partial failure modes of operation within the different bistable devices which form a part of the system bus priority networks and control circuits. Also, a part or component in the process of failing will operate unreliably thus introducing intermittent errors. Further, unique conditions can arise, such as several units simultaneously requesting system bus access, which cause still another kind of intermittent error condition.

Thus, there is a definite need for a resilient bus arrangement. This is in contrast to trying to increase the reliability of a system bus through the introduction of redundant circuits or special hardware checking facilities.

Additionally, the resilient bus arrangement must be compatible with normal testing procedures. That is, frequently, such testing procedures involve introducing bad data into system units to verify their operation. While it is possible to place each system element in a special test mode, this can require additional hardware and software as well as added complexity. Further, this may not be possible in cases where the system is required to operate with a number of different units including units of older designs. When older design units are made attachable to a resilient bus arrangement, exception conditions can occur which are inconsistent with a given set of rules required for enforcing system integrity. In the case of a memory system, exception conditions would include situations in which the memory system contains bad data.

Since the exception conditions can vary with each unit, the implementation of each interface unit could differ substantially adding to system complexity. Moreover, this could affect overall system reliability and interfere with the consistent maintenance of system integrity. Accordingly, there is a need for a resilient bus arrangement which is compatible with normal testing procedures and a number of different units including units of older designs.

Accordingly, it is a primary object of the present invention to provide a system which is resilient to errors occurring during bus transfers made during both normal and test operations.

It is a further object of the present invention to provide a resilient system which prevents damage to the integrity of a system's data and operation notwithstanding the number of different units it contains.

SUMMARY OF THE INVENTION

The above objects of the present invention are achieved by the illustrative embodiment which includes a plurality of units which are coupled to transfer requests including data, command and integrity signals between units over a bus system during allocated bus transfer cycles. Each unit has a common interface portion which includes response apparatus for acknowledging requests received from other units. The common interface section of each of a number of units further includes retry apparatus and checking apparatus for verifying that the different parts of a request received from such unit over the bus system are valid based on the states of accompanying function identification signals. By partitioning the different parts of a request, request verification is facilitated. This ensures the standardization of interface implementation within the system resulting in greater reliability and lower cost.

In the absence of a predetermined signal from a sending unit denoting a condition which is an exception to normal operation, the receiving unit's interface portion prevents acceptance of the request when less than all of the parts of the request defined as requiring verification are detected as valid, and inhibits its response apparatus from generating a response. This permits the receiving unit at an early point in a transfer operation to reject the cycle in a way that it is automatically communicated to the requesting unit.

In the present embodiment of the invention, the lack of a response causes the generation of a negative acknowledgement by timeout apparatus which connects to the bus system. This prevents damage to system integrity and permits the requesting unit with retry apparatus to retry the request during a subsequent bus transfer cycle. Also, by having the receiving unit not respond reduces interference and permits the allocation of bus cycles only to those units receiving valid requests. Thus, the present invention utilizes the fact that error conditions caused by the bus system are essentially intermittent. Therefore, a single retrying of the request will correct the error condition, unless it is due to a failure.

When a predetermined signal from a sending unit is received which denotes an exception condition, this inhibits the checking apparatus of the receiving unit from verifying that all of the parts of the request requiring verification are valid. That is, in the preferred embodiment, the data part of the request is automatically treated as valid, since the presence of the predetermined signal denotes an exception to normal operation (i.e., an exception to the presumption that valid data is being sent). The predetermined signal is generated under test conditions or when the particular sending unit is aware that bad data is being sent. An example of the latter is the detection of an uncorrectable error condition by a memory unit during a read operation.

In the disclosed embodiment, the present invention is utilized in a data processing system which includes units of older designs. These units do not include the apparatus of the present invention and are unable to perform a checking operation on a number of the parts of a request. However, when such older design unit transfers a request to a unit which includes the apparatus of the present invention, the unit generates a response which is the same as the older design unit would have received if being operating in the old system. Additionally, the additional integrity bits generated by the receiving unit can be transferred to other parts of the unit and used for additional checking following acceptance of the request.

Accordingly, the invention finds use in a variety of systems containing mixtures of old and new units. Moreover, the introduction of the apparatus of the present invention does not require any changes in the operation and the circuitry of such old units. Further, identical circuits can be used in each unit reducing system complexity and cost.

The novel features which are believed to be characteristic of the invention both as to its organization and method of operation, together with further objects and advantages will be better understood from the following description when considered in connection with the accompanying drawings. It is to be expressly understood, however, that each of the drawings are given for the purpose of illustration and description only and are not intended as a definition of the limits of the present invention.

BRIEF DESCRIPTION OF THE DRAWINGS

FIGS. 5a through 5f show the formats of the requests and responses generated by the system of FIG. 1 according to the teachings of the present invention.

DESCRIPTION OF SYSTEM OF FIG. 1

Figure 1:
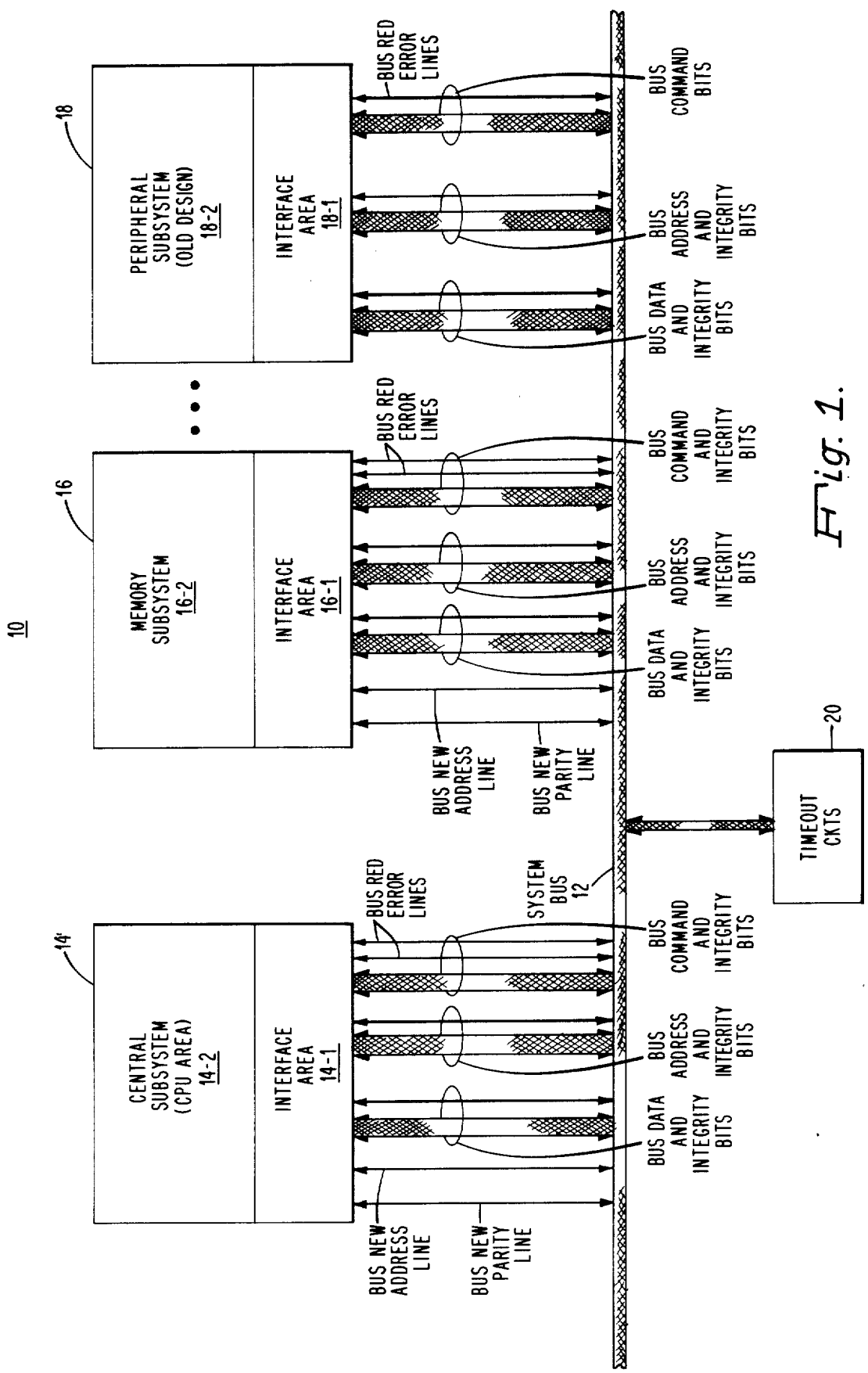
FIG. 1 is a block diagram of a system which includes the apparatus of the present invention.

FIG. 1 shows a data processing system 10 which includes a plurality of subsystems 14 through 18 of old and new designs which couple in common to a system bus 12. The illustrative subsystems include a central subsystem 14, a memory subsystem 16 and a peripheral subsystem 18. Each subsystem includes an interface area which enables the unit or units associated therewith to transmit or receive requests in the form of commands, interrupts, data or responses/status to another unit on system bus 12 in an asynchronous manner.

It is assumed that only subsystems 14 and 16 are new in design and incorporate the apparatus of the present invention in their interface areas 14-1 and 16-1, respectively. The peripheral subsystem 18 is assumed to be designed for inclusion in an earlier system, such as the system disclosed in U.S. Pat. No. 3,995,258, entitled "Data Processing System Having a Data Integrity Technique", invented by George J. Barlow. Hence, its interface area 18-1 does not include the apparatus of the present invention but connects to system bus 12 and operates as in the earlier system as explained herein. Interface area 18-1 includes bus interface logic circuits disclosed in FIG. 9 of U.S. Pat. No. 3,995,258.

By way of illustration, only three subsystems are shown in FIG. 1. However, data processing system 10 normally includes additional subsystems of both new and old designs for connecting a full complement of peripheral devices, other processing units and communication devices to system bus 12. In addition to these subsystems, system 10 includes timer apparatus which takes the form of timeout logic circuits of block 20. As shown, these circuits couple to system bus 12 and operate to generate a signal after a predetermined period of time, such as five microseconds, which in turn produces a negative acknowledgement response signal on system bus 12 as explained herein.

As mentioned above, each of the interface areas 14-1 and 16-1 includes the apparatus of the present invention. Except as stated herein, both of these interface areas can be considered equivalent in design. Therefore, only interface area 14-1 is described in detail herein with reference to FIG. 2.

GENERAL DESCRIPTION OF INTERFACE AREA 14-1

Figure 2:
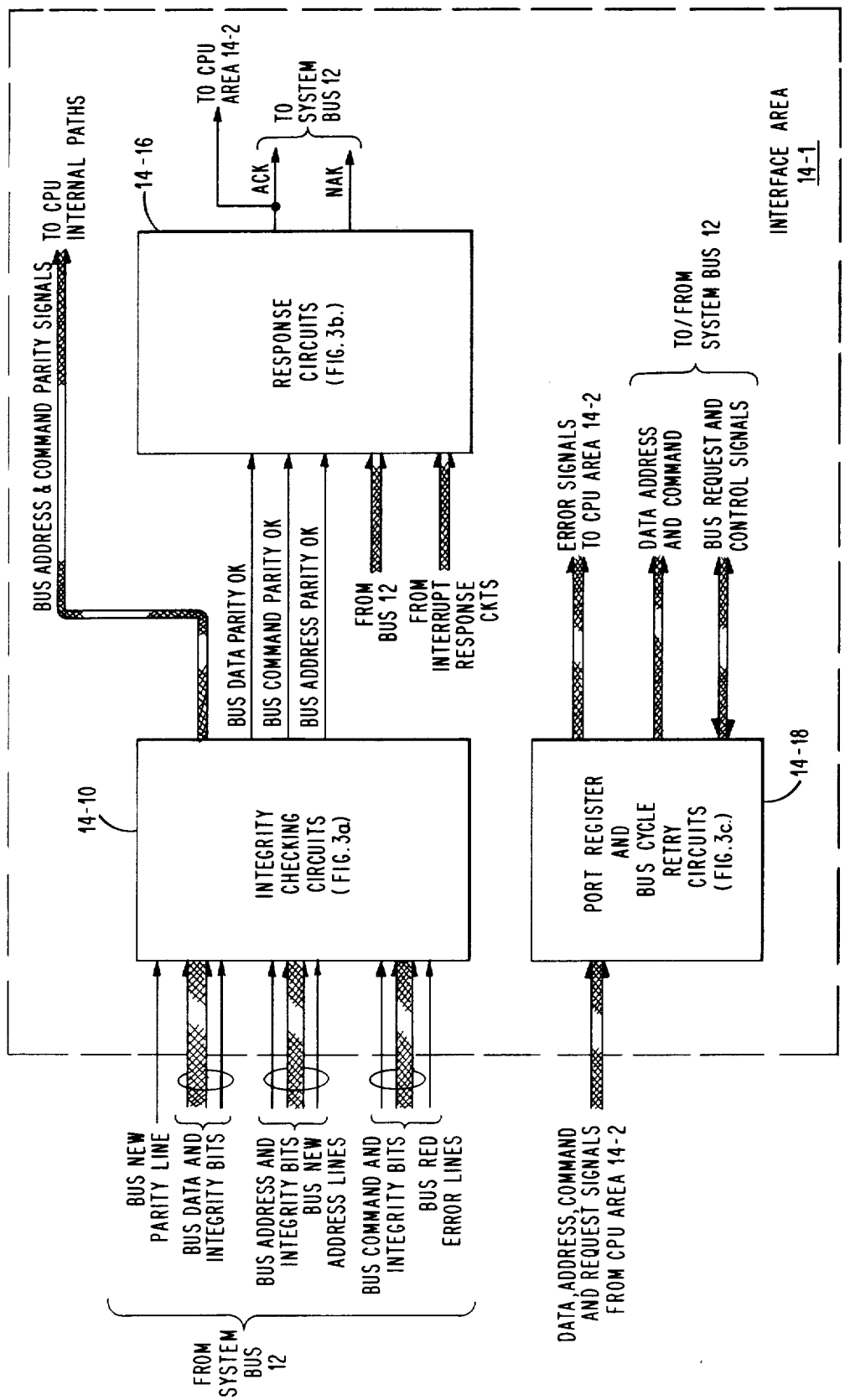
FIG. 2 shows in greater detail, the central subsystem of FIG. 1.

Referring to FIG. 2, it is seen that the interface area 14-1 includes the integrity checking circuits of block 14-10, the response circuits of block 14-16 and the port registers and bus retry circuits of block 14-18. As shown, the circuits of block 14-10 couple to system bus 12 and receive as inputs all of the signals applied to the different portions of system bus 12. These include a bus new parity line, a 36-bit wide data portion, a 36-bit wide expanded address portion, a number of bus new address line(s), and a 9-bit wide command portion. Additionally, the circuits 14-10 receive a pair of bus red error signals which denote the occurrence of an exception condition as explained herein.

The circuits of block 14-10 generate a bus data parity OK signal, a bus command parity OK signal and a bus address parity OK signal, indicating whether or not the data, command and address parts respectively of a request applied to bus 12 are valid. Additionally, in the case of requests received from older subsystems (e.g. subsystem 18), block 14-10 provides bus address parity and command signals for distribution within the central processing unit (CPU) area 14-2 as explained herein. The bus parity OK signals are applied as inputs to the response circuits of block 14-16. These circuits operate to generate on bus 12 several types of responses. One is an acknowledgement (ACK) response indicating that a valid request was received. Another is a negative acknowledgement (NAK) response indicating that the request could not be processed at that time. A third type of response is no response which produces a timeout condition and causes a retry of the request as explained herein.

Additionally, the response circuits of block 14-16 receive signals from bus 12 indicative of the type of bus cycle being performed and signals from interrupt response circuits, not shown, indicating whether or not the interrupt level of the requestor is sufficient to be accepted, as explained herein.

The port registers and bus retry circuits of block 14-18 couple to system bus 12. The block 14-18 stores address, data and command portions of each request received from CPU area 14-2 for subsequent transfer to system bus 12. Additionally, block 14-18 includes circuits for retrying a request on system bus 12 when the request is not verified by the receiving unit, as explained herein.

DETAILED DESCRIPTION OF INTERFACE AREA 14-1

Figure 3A:
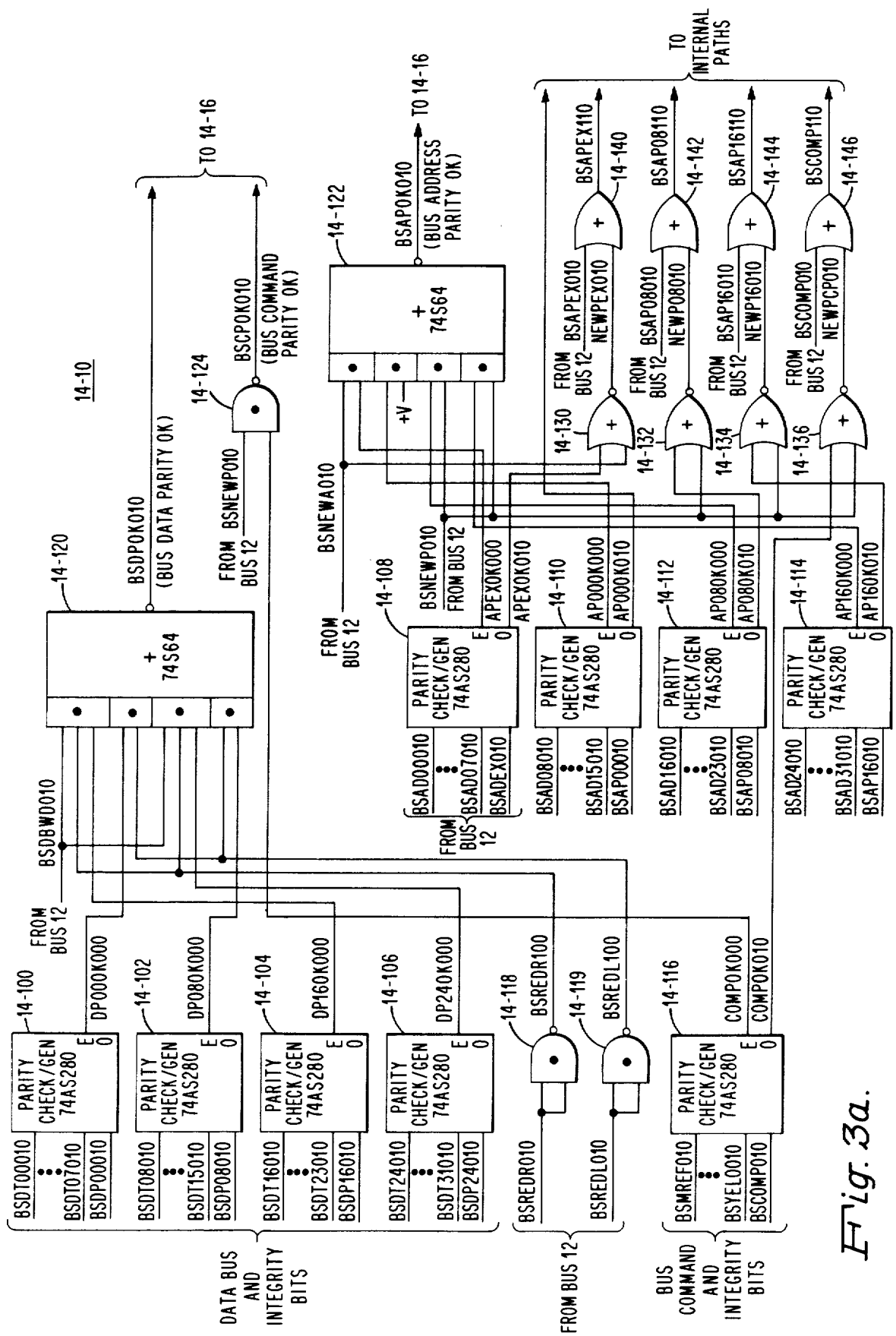
FIGS. 3a through 3c show in greater detail, the central subsystem interface area of FIG. 2.

FIG. 3a shows in greater detail, the integrity checking circuits of block 14-10. As shown, these circuits include three gorups of parity check and generator circuits constructed from conventional chips such as the 74AS280 manufactured by Texas Instruments Corporation. The first group of 74AS280 chip circuits 14-100 through 14-106 generate data parity check signals DP00OK000 through DP240K000 at their even (E) output terminals for the 32 data bit signals BSDT00010 through BSDT31010 and four parity integrity data bit signals BSDP00010 through BSDP24010.

The next group of 74AS280 chip circuits 14-108 through 14-114 generate address parity check signals APEXOK000 through AP16OK000 at their even output terminals for the 32 address bit signals BSAD00010 through BSAD31010 and four parity integrity address bit signals BSAPEX010 through BSAP16010. A last 74AS280 chip circuit 14-116 generates command parity check signal COMPOK000 and complement check signal COMPOK010 at its even and odd output terminals respectively for selected eight command bit signals BSMREF000 through BSYEL0010 and parity integrity command bit signal BSCOMP010.

Each of the data parity check signals DP00OK000 through DP240K000 is combined with a corresponding one of the bus red right error and bus red left error signals BSREDR100 and BSREDL100 and a bus double wide signal BSDBWD010 in the case of last two check signals within AND-OR invert gate circuit 14-120 constructed from a conventional chip such as 74S64 manufactured by Texas Instruments Corporation. The bus red error signals are generated by a pair of NAND gates 14-118 and 14-119 which receive signals BSREDR010 and BSREDL010 respectively from bus 12. Except for address parity check signal AP000K000, each of the remaining address parity check signals APEXOK000 through AP16OK000 is combined with either a bus new address signal BSNEWA010 or bus new parity signal BSNEWP010 within AND-OR invert gate circuit 14-122. Lastly, the command parity check signal COMPOK000 is combined with new bus parity signal BSNEWP010 within a NAND gate circuit 14-124 constructed from a 74AS804A type chip.

Whenever any one of the data parity check signals at the even output terminals of circuits 14-100 through 14-106 is a binary ONE, this signals an error in a corresponding part of the data portion of the request being received from system bus 12. The result is that one of the AND input circuits of circuit 14-120 receiving the binary ONE applies a binary ZERO as an input to the OR invert gate part of circuits 14-120 forcing bus data parity OK signal BSDPOK010 to a binary ZERO signalling receipt of invalid bus data. However, when one of the bus red error signals BSREDR010 or BSREDL010 is forced to a binary ONE indicative of an exception condition, this inhibits the OR gate part of circuits 14-120 from forcing bus data parity OK signal BSDPOK010 to a binary ZERO.

In a similar manner, whenever any one of the address parity check signals at the even output terminals of circuits 14-108 through 14-114 is a binary ONE, this signals an error in a corresponding part of the address portion of the request being received from system bus 12. The result is that one of the AND input circuits of circuit 14-122 receiving the binary ONE applies a binary ZERO as an input to the OR gate part of circuit 14-122 forcing bus address parity OK signal BSA-POK010 to a binary ZERO signalling receipt of an invalid bus address. Similarly, when command parity check signal COMPOK000 at the even output terminal of circuit 14-116 is a binary ONE, this signals an error in the associated command bits of the request being received from system bus 12. The result is that NAND circuit 14-124 receiving the binary ONE applies a binary ZERO to the circuit 14-124 which forces bus command parity OK signal BSCPOK010 to a binary ZERO signalling receipt of an invalid bus command.

Because the subsystems of FIG. 1 include both new and old subsystems, bus new parity signal BSNEWP010 and bus new address signal BSNEWA010 are used to differentiate between these two types of subsystems. As mentioned above, only the new subsystems provide full integrity checking of requests before acceptance. Accordingly, each such subsystem operates to force signals BSNEWP010 and BSNEWA010 to binary ONES. In the case of an older subsystem, the bus new parity line and bus new address line are absent. Hence, signals BSNEWP010 and BSNEWA010 remain binary ZEROS. This effectively disables the address checking circuits by causing circuits 14-122 to automatically force bus address parity OK signal BSAPOK010 to a binary ONE.

The state of bus double wide line is used to signal whether or not the request includes a transfer of all 32 data bits by a subsystem that has a double wide data path. That is, when signal BSDBWD010 is a binary ONE indicative of a 32-bit double wide data transfer, the circuits 14-120 are conditioned to verify the integrity of all 32 bits. When signal BSDBWD010 is a binary ZERO indicative of a transfer of 16 data bits, circuits 14-120 are effectively disabled from performing a check of data bits 16-31 (i.e., cause their NAND circuits to apply binary ONE input signals to the AND portion of circuits 14-120).

Additionally, the integrity circuits of block 14-10 further include series connected NOR gates 14-130 through 14-136 and OR gates 14-140 through 14-146. NOR gate 14-130 combines bus new address signal BSNEWA010 and expanded address check parity signal APEXOK010 from the odd output terminal of parity check/generator circuit 14-108. Similarly, gates 14-132 through 14-136 respectively combine bus new parity signal BSNEWP010 and address check parity signals AP08OK010, AD16OK010 and CMPOK010 from the odd output terminals of parity check/generator circuits 14-112, 14-114 and 14-116.

The arrangement recognizes that older subsystems will not transmit new address integrity signals on system bus 12. Thus, the integrity signals BSAPEX010, BSAP08010 and BSAP16010 received by the integrity checking circuits 14-10 will be binary ZEROS. Since the binary ZERO states of signals BSAPEX010, BSAP08010 and BSAP16010 received from system bus 12 is guaranteed, ORing these signals with signals NEWPEX010, NEWP08010 and NEWP16010 from NOR gates 14-130 through 14-134 provide good parities in the form of signals BSAPEX110, BSAP08110 and BSAP16110 to the internal address paths of central subsystem 14-2.

In this instance, parity circuits 14-108, 14-112 and 14-114 function as parity generators in providing odd parity for address bit signals BSAD00010-31010. Here, when bus new address signal BSNEWA010 or bus new parity signal BSNEWP010 is a binary ZERO, the corresponding one the signals BSAPEX010 through BSAP16110 assumes the state of parity signals APEXOK010 through AP16OK010. When bus new address signal BSNEWA010 or bus new parity signal BSNEWP010 is forced to a binary ONE indicative of a request from a new subsystem, the corresponding one of the signals BSAPEX010 through one of BSAP16110 assumes the state of the address integrity signals BSAPEX010 through BSAP16010 from system bus 12. Similarly, good command parity is generated for signal BSCOMP110. By timesharing the parity circuits 14-108 through 14-114 in this manner, good parity signals are transferred to subsystem address and command paths in the case of both new and older subsystem requests.

Additionally, bus data parity OK signal BSDPOK010, bus command parity OK signal BSCPOK010 and bus address parity OK signal BSAPOK010 are applied to the response circuits 14-16. This permits a response as explained herein.

RESPONSE CIRCUITS OF BLOCK 14-16

Figure 3B:
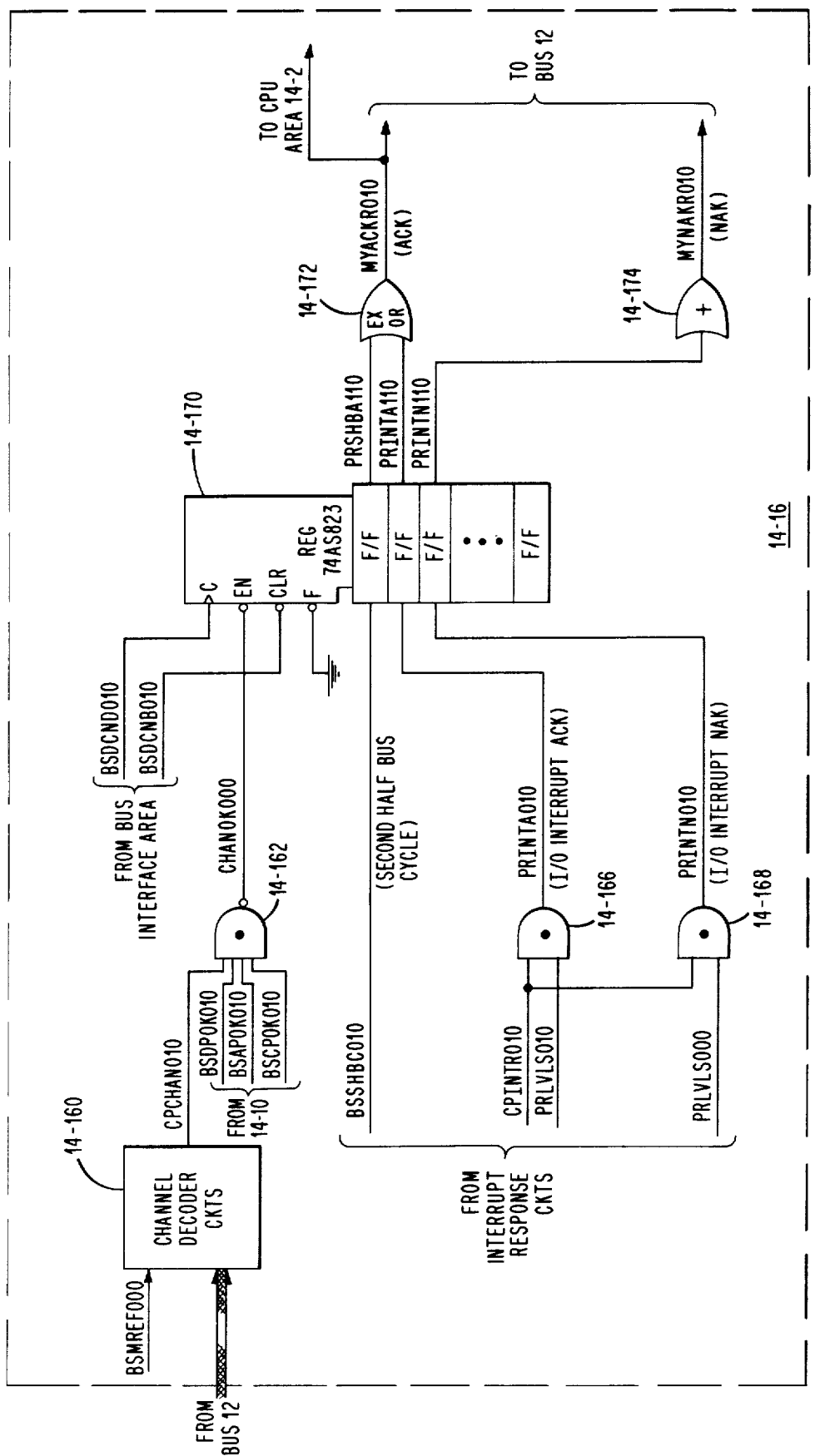

Only the new subsystems of FIG. 1 include circuits equivalent to those of block 14-16. As shown in FIG. 3b, the circuits of block 14-16 include channel decoder circuits 14-160, a NAND gate 14-162, a plurality of AND gates 14-164 through 14-168, a 9-bit register 14-170, an output exclusive OR gate circuit 14-172 and OR gate 14-174 connected as shown. The gates and register are conventional in design. For example, register 14-170 may be constructed from a 74AS823 chip circuit manufactured by Texas Instruments Corporation.

The circuits of block 14-160 operate to detect when the unique channel number assigned to central subsystem 14-2 is applied to system bus 12. These circuits include comparison circuits which compare the received channel number with an internally stored channel number and force CP channel signal CPCHAN010 to a binary ONE upon detecting an identical comparison therebetween. NAND gate 14-162 combines signal CPCHAN010, bus data parity OK signal BSDPOK010, bus command parity OK signal BSCPOK010 and bus address parity OK signal BSPAOK010 to produce channel OK signal CHANOK000. It forces signal CHANOK000 to a binary ZERO when the integrity checking circuits 14-10 have verified that all of the specified parts of the request received by central subsystem 14 are valid. This, in turn, enables register 14-170 for storing the states of signals PRSHBA010, PRINTA010 and PRINTN010 in response to bus data cycle now delayed signal BSDCND010. This signal defines the interval of time during which the addressed subsystem (slave) will have been able to detect its channel address. For further discussion, reference may be made to U.S. Pat. No. 3,995,258. The signals PRSHBA010 through PRINTN010 identify the type of bus cycle being performed and are used to generate either an acknowledgement or negative acknowledgement response signal.

In greater detail, the second half bus cycle is the interval during which previously requested information is transferred to the requesting subsystem. It is the second cycle of a two cycle operation, such as a read operation. Signal BSSHBC010 is received from system bus 12 when the subsystem (e.g. memory subsystem 16 is transferring the data previously requested by central subsystem 14.

AND gates 14-166 and 14-168 combine CPU interrupt signal CPINTR010 and complementary processor level signals PRLVLS010 and PRLVLS000 to produce I/O interrupt acknowledgement and negative acknowledgement signals PRINTA010 AND PRINTN010. The CPU interrupt signal CPINTR010 and processor level signal PRLVLS010 when both binary ONES indicating that the interrupting subsystem has a higher priority than the current operating level (i.e., level number value is less) causes AND gate 14-166 to force acknowledgement signal PRINTA010 to a binary ONE. At that time, complementary processor level signal PRLVLS000 is a binary ZERO. However, when processor level signal PRLVLS000 is a binary ONE indicating that the interrupting subsystem has a lower priority than the current operating level, AND gate 14-168 forces negative acknowledgement signal PRINTN010 to a binary ONE.

The acknowledgement signals PRSHBA110 and PRINTA110 are combined within exclusive OR gate 14-172 for checking urposes so that my acknowledgement signal MYACKR010 is generated when only one of the acknowledgement signals is a binary ONE. The negative acknowledgement signal PRINTN110 when a binary ONE causes OR gate 14-174 to force my negative acknowledgement signal MYNAKR010 to a binary ONE. As seen from FIG. 3b, signals MYACKR010 and MYNAKR010 are applied to system bus 12 via convention driver circuits, not shown.

As discussed above, memory subsystem interface area 16-1 includes similarly constructed response circuits with one exception. The memory response circuits include circuits for generating a wait response in lieu of the second half bus cycle signal. However, one of two complementary signal indicating the busy status of the memory is applied to an appropriate one of a pair of gates equivalent to AND gates 14-166 and 14-168.

PORT REGISTERS AND BUS RETRY CIRCUITS

Figure 3C:
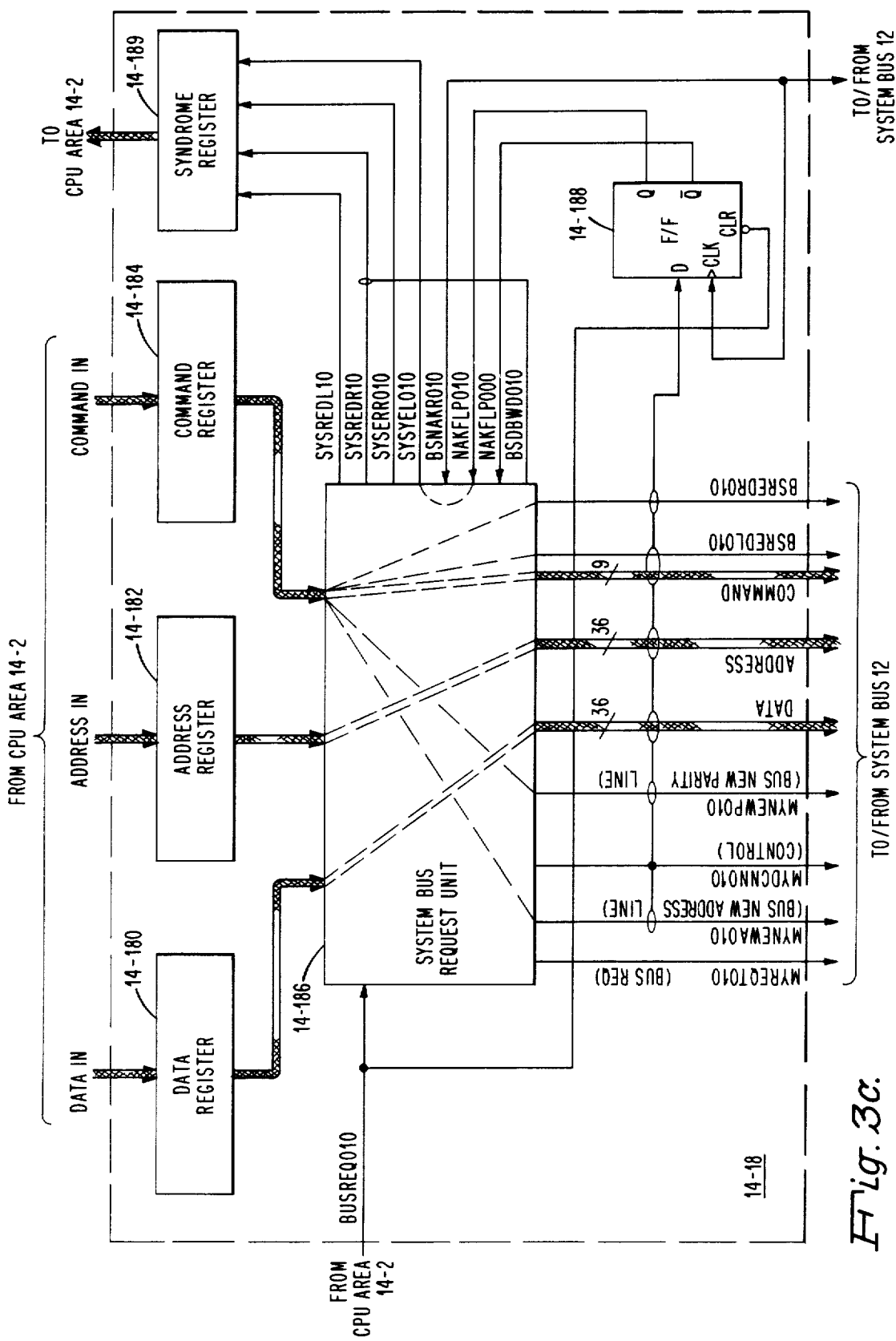

FIG. 3c shows in greater detail, the port registers and retry circuits of block 14-18 of FIG. 2. As shown, block 14-18 includes a plurality of registers 14-180, 14-182 and 14-184 which store the data, address, command and integrity bits of a request generated by central processing unit area 14-2. The contents of these registers are applied via a system request unit 14-186 and driver circuits, not shown, to the data, address and command portions of system bus 12.

Also, my new parity signal MYNEWP010 and my new address signal MYNEWA010 are forced to binary ONES which in turn cause bus new parity line and bus new address line respectively to be forced to binary ONES. All of the signals of the request are gated onto system bus 12 with my data cycle now signal MYDCNN010. At that time, system request unit 14-186 operates to force my request signal MYREQT010 to a binary ONE signalling a receiving subsystem of the request. Signal MYREQT010 is generated according to the following Boolean equation:

MYREQT010=BUSREQ010+(MYDCNN010-
·NAKFLP000·BSNAKR010).

The second half of the equation pertains to generating my request signal MYREQT010 for retrying any request which was not accepted by a receiving subsystem as explained herein. In addition to unit 14-186, the retry circuits further include a D-type flip-flop 14-188 and a multibit syndrome register 14-189. The flip-flop 14-188 is held in a binary ZERO state when CPU area 14-2 is not issuing a bus request (i.e., signal BUSREQ010 is a binary ZERO). The flip-flop 14-188 is permitted to switch signal NAKFLP010 to a binary ONE state when signal BUSREQ010 is switched from a binary ZERO to a binary ONE according to the following equation:

SET=MYDCNN010·BSNAKR010.

Thus, it stores the fact that a negative acknowledgement was received from system bus 12.

In response to signal NAKFLP010 being forced to a binary ONE, system bus request unit 14-186 forces a system yellow signal SYSYEL010 to a binary ONE (i.e., SYSYEL010=NAKFLP010·TIMOUT010). Also, unit 14-186 forces a system error signal SYSERR010 to a binary ONE according to the following Boolean equation:

SYSERR010=MYDCNN010·NAKFLP010·B-
SNAKR010·TIMOUT010.

Both of these signals are stored in syndrome register 14-189 for forwarding to the CPU area 14-2 for action as explained herein.

The signal TIMOUT010 is generated by timeout circuits, conventional in design included within block 14-186. These circuits force signal TIMOUT010 to a binary ONE when they detect that signal MYDCNN010 has remained at a binary ONE for a predetermined period of time which corresponds to three microseconds.

The syndrome register 14-189 couples to bus 12 via system bus request unit 14-186. Different bit positions of register 14-189 are conditioned to store the state of different signals received from bus 12 and generated by unit 14-186. In addition to signals SYSERR010 and SYSYEL010, register 14-189 stores red error signals SYSREDL10 and SYSREDR10. These signals are derived from signals BSREDL010 and BSREDR010 received from bus 12 which are synchronous with signal MYDCNN010. Signal BSREDL010 when a binary ONE indicates an error which was known by the sending (master) unit. For example, this signal is used by the memory subsystem 16-2 during a read second half bus cycle to indicate that an uncorrectable error was detected in the left most word. The unit (slave) receiving this signal stores its state in register 14-189 and reports same as an error in status.

Similarly, signal BSREDR010 when a binary ONE indicates an error which was known by the sending unit. This signal is only driven to the binary ONE state which double word wide signal BSDBWD010 is a binary ONE. This signal is used by the memory subsystem unit 16-2 during a read second half bus cycle to indicate that an uncorrectable error was detected in the right most word of a double word. The unit receiving this signal stores its state in register 14-189 and reports same as an error in status.

During testing, as explained herein, the sending unit can force red error signals BSREDL010 and BSREDR010 to binary ONES by loading with binary ONES the appropriate bit positions of command register 14-184.

GENERAL DESCRIPTION OF MEMORY SUBSYSTEM 16-2 AND MEMORY INTERFACE AREA

Figure 3D:
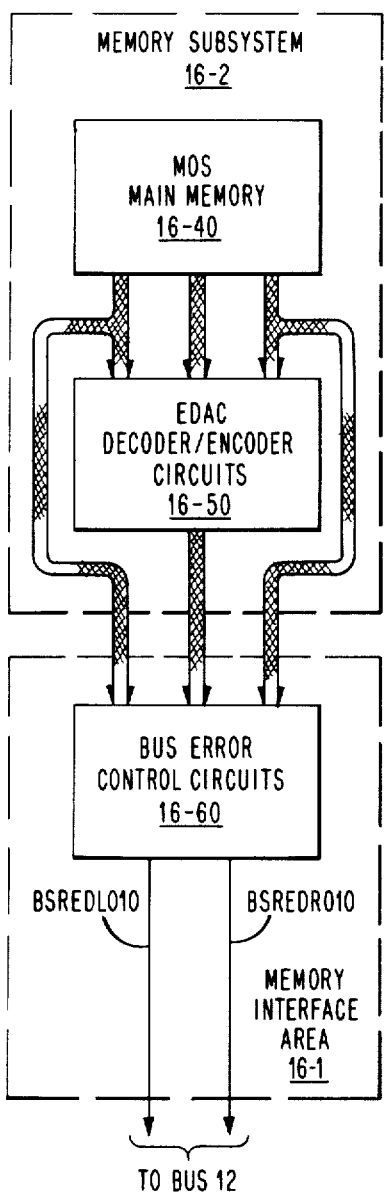
FIG. 3d shows in greater detail, the memory subsystem of FIG. 1.

FIG. 3d shows in block diagram form, the basic organization of memory subsystem 16-2. The subsystem 16-2 includes a main memory 16-40 which has a plurality of MOS memory modules. These modules couple to error detection and correction encoder/decoder circuits included within block 16-50. It will be assumed that a single matrix is used as both an encoder and a decoder. The signals from matrix 16-50 are applied as inputs to the bus error control circuits of block 16-60 together with the checking signals read out from the main memory modules of block 16-40. The control circuits of block 16-60 operate to generate red error left and red error right signals BSREDL010 and BSREDR010, respectively, indicating the presence of an uncorrectable error within the left (even) and right (odd) words. For the purpose of the present invention, the circuits of FIG. 3d may be considered conventional in design and may, for example, take the form of the circuits disclosed in U.S. Pat. No. 4,388,684.

DESCRIPTION OF OPERATION

With reference to flow diagrams of FIGS. 4a and 4b, the operation of interface area 14-1 will now be described relative to processing the requests of FIG. 5. It is assumed that central subsystem 14 desires to write or read data from memory subsystem 16. In such case, subsystem 14 operates to generate a memory request having the format of FIG. 5a or 5b. That is, subsystem 14-2 loads the data, address, command and integrity bits into registers 14-180 through 14-184. Additionally, subsystem 14-2 forces bus request signal BUSREQ010 to a binary ONE. This results in my request signal MYREQT010 being forced to a binary ONE and the clearing of flip-flop 14-188 to a binary ZERO.

Signal MYREQT010 forces a bus request line BSREQT to a binary ONE signalling that subsystem 14 is requesting a bus cycle. For a memory request, the command bits are set as follows: BSMREF010=1; BSWRIT010=0= (read) BSWRIT010 1= (write); BSLOCK010=0; BSSHBC010=0; BSDBWD010=1; BSBYTE010=0; BSDBPL010=1, and BSYELO010=0. Since this is not a test operation red error bits BSREDL010 and BSREDR010 are both binary ZEROS.

Additionally, certain combined bit positions of register 14-184 are appropriately set to force bus new parity line BSNEWP and bus new address line BSNEWA to the required states. That is, in this example, signals NYNEWA010 and NYNEWP010 are forced to binary ONES.

When central subsystem 14 has been granted a bus cycle in response to signal BUSREQ010, signal MYDCNN010 is forced to a binary ONE by priority network circuits included within unit 14-186. These circuits are conventional in design and may take the form of the circuits disclosed in U.S. Pat. No. 3,995,258. At that time, the memory request together with new bus parity signal MYNEWP010 and bus new address signal MYNEWA010 are applied to system bus 12.

Figure 4A:
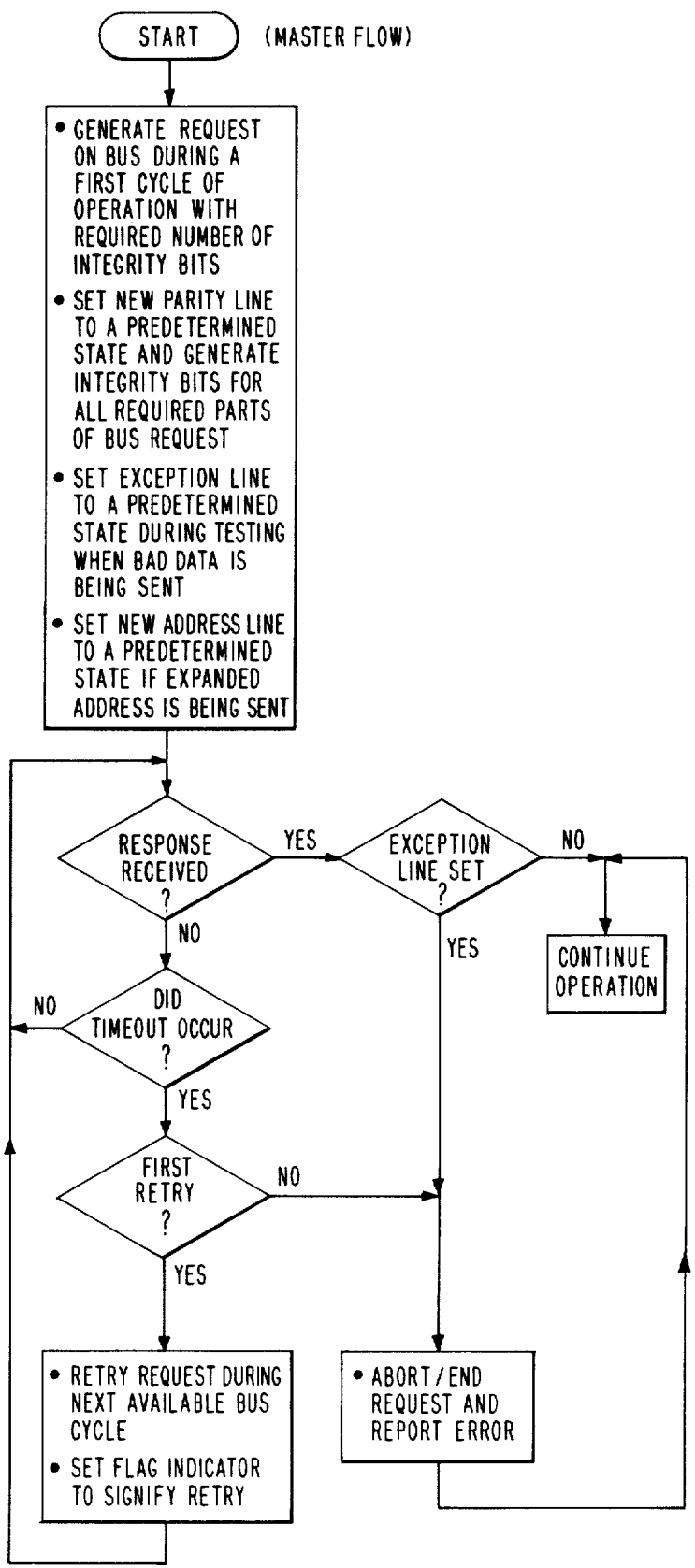
FIGS. 4a and 4b are flow charts used to explain the operation of the apparatus of the present invention.
Figure 4B:
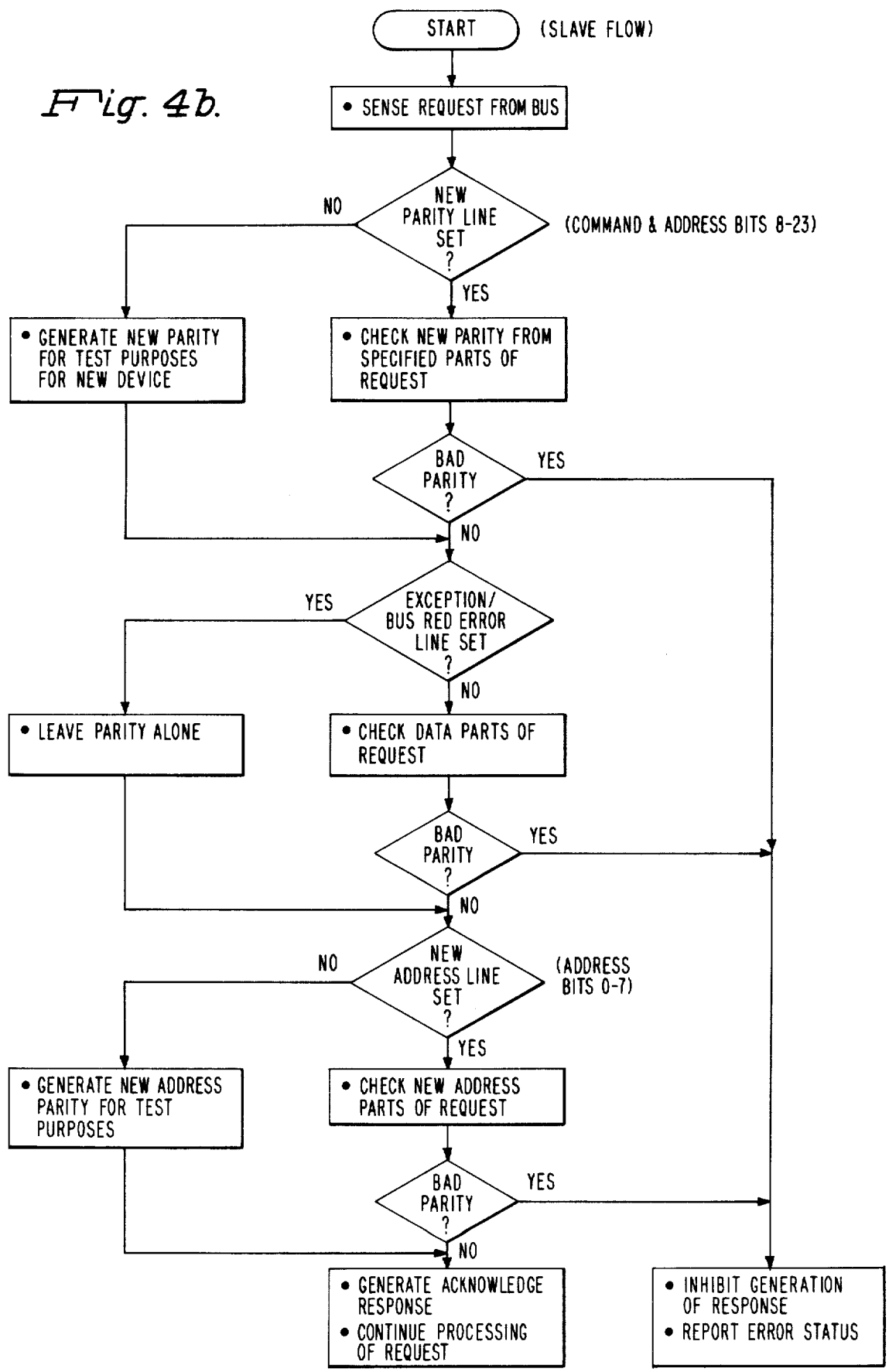

As seen from FIG. 4b, memory subsystem area 16-1 operates to sense the request from system bus 12. This is done by channel decoder circuits similar to those of block 14-160 which detect the memory subsystem's channel address and that the bus memory reference command bit BSMREF is a binary ONE. Next, memory subsystem determines the state of bus new parity line which establishes whether or not the new integrity checks will be performed. Since signal BSNEWP010 is a binary ONE, circuits included in block 16-1 of FIG. 3d which are identical to those of FIG. 3a operate to perform an integrity check on the command and address bits 8-23 parts of the memory request. When either part of the request cannot be verified as valid, the integrity check circuits operate to force either bus command parity OK signal or bus address parity OK signal to a binary ZERO.

As seen from FIG. 4b, this causes the memory subsystem 16 to inhibit the generation of a response. That is, circuits included in block 16-1 similar to those of FIG. 3c, force channel OK signal CHANOK000 to a binary ONE inhibiting the generation of any response.

Now, the time out circuits of block 20 started a timing interval in response to the generation of my data cycle now signal MYDCNN010 by system request unit 14-186 of FIG. 3c. Because memory subsystem 16 fails to generate any response (acknowledgement, wait or negative acknowledgement), the circuits of block 20 at the end of a five microsecond interval genrate a negative acknowledgement signal. This results in signal BSNAKR010 being forced to a binary ONE which, in turn, switches flip-flop 14-188 of FIG. 3c to a binary ONE.

As seen from FIG. 4a, central subsystem 14 upon detecting having not received a response and that a bus timeout occurred, determines whether or not this is the first time that the request is to be retried. This is defined by the state of flip-flop 14-188. That is, when the flip-flop 14-188 is in a binary ZERO state, the receipt of negative acknowledgement signal BSNAKR010 at the end of the bus cycle causes my request signal MYREQT010 to be switched again to a binary ONE. At that time, my data cycle now signal MYDCNN010 is still a binary ONE.

When central subsystem 14 is again granted access to system bus 12, my data cycle now signal MYDCNN010 is again switched to a binary ONE. This again applied the request contents of registers 14-180 through 14-184 together with new parity line signal MYNEWP010 and my new address signal MYNEWA010 to system bus 12. Again, the operations of FIGS. 4a and 4b are performed by subsystems 14 and 16.

It will be noted that negative acknowledgement signal BSNAKR010 causes flip-flop 14-188 to switch to a binary ONE (i.e., set=MYDCNN010·BSNAKR010). This, in turn, forces error signal SYSYEL010 to a binary ONE when internally generated timeout signal TIMOUT010 is a binary ONE. The state of signal SYSYEL010 is stored in syndrome register 14-189. It is used to signal central processing unit area 14-2 of the occurrence of the bus error and resulting first retry operation.

As seen from FIG. 4a, in the event that the retry operation is not successful, the timeout circuits of block 20 operate to generate a second negative acknowledgement signal. This causes the system bus request unit 14-186 to force system error signal SYSERR010 to a binary ONE. The state of signal SYSERR010 is stored in syndrome register 14-189. Since this is the second retry, central subsystem 14 operates to abort the request and report the unsuccessful entry error condition via register 14-189. Since the condition which produced the error could not be remedied by retrying the request once, it is viewed by the system as a solid failure.

As seen from FIG. 4b, when the command and address bits 8-23 parts of the retried request are verified by memory subsystem 16, then the memory subsystem integrity checking circuits operate to force bus command parity OK signal BSCPOK010 to a binary ONE state and enable bus address parity OK signal BSAPOK010 to be forced to a binary ONE as a function of the state of bus new address signal BSNEWA010 as explained herein.

As seen from FIG. 4b, memory subsystem 16 next determines whether or not an exception condition is present. That is, it verifies the states of bus error signals BSREDL010 and BSREDR010. Since these both are binary ZEROS, memory subsystem 16 checks the data parts of the memory request. When any part of the data is bad, circuits identical to block 14-10 operate to force bus data parity OK signal BSDPOK010 to a binary ZERO. This again causes memory system 16 to inhibit the generation of a response in the same manner as described above. Accordingly, the same sequence of operations described above is repeated resulting in a successful retry operation or the aborting of the request.

When memory system 16 verifies that the data parts of the request are error free, the integrity checking circuits operate to force bus data parity signal BSDPOK010 to a binary ONE. As seen from FIG. 4b, this in turn permits the memory subsystem response circuits to generate an acknowledgement response as a function of the state of bus new address line. Since bus new address line is a binary ONE, memory system 16 checks the new address parts (i.e., bits 0-7) of the memory request for errors.

When any new address part is bad, circuits identical to block 14-10 operate to force bus address parity OK signal BSAPOK010 to a binary ZERO. Again, this causes memory system 16 to inhibit the generation of a response and repeat the same sequence of operations described above. This results in either a successful retry operation or the aborting of the request.

Only after the verification of each specified part of the request, is memory subsystem 16 permitted to accept and process the request. That is, positive acknowledgement signal MYACKR010 enables the request from system bus 12 to be loaded into the queue registers of the memory subsystem. For further information regarding how this is accomplished, reference may be made to U.S. Pat. No. 4,451,880, titled "Memory Controller with Interleaved Queuing Apparatus". Thus, the possibility of damage to memory information or the initiation of an invalid operation has been eliminated.

It is seen from FIG. 4b that the central subsystem 14 can control which parts of the memory request are verified by memory subsystem 16 by altering the states of bus new parity line BSNEWP and bus new address line BSNEWA. When either one or both lines are forced to binary ZEROS, the corresponding parts of the memory request are not required to be verified before a response is generated. For example, when the corresponding bit position of register 14-184 forces signal MYNEWP010 to a binary ZERO for testing purposes, circuits identical to block 14-10 force bus command parity OK signal BSCPOK010 and bus address parity OK signal BSAPOK010 to binary ONES even when an error has been detected in the command or address bits 16-31 parts of the memory request. Circuits identical to gates 14-142 through 14-146 included within memory system 16 generate new parity for the corresponding parts of the memory request.

Similarly, when the corresponding bit position of register 14-184 forces signal MYNEWA010 to a binary ZERO for testing purposes, circuits identical to block 14-10 force bus address parity OK signal BSAPOK010 to a binary ONE even when new address bits 0-7 of the memory request were detected to contain an error. A circuit identical to gate 14-140 generates a new parity signal for this address part of the memory request.

It is also seen that central system 14 can cause memory subsystem 16 to ignore errors present in the data parts of the memory request. That is, during testing, by loading certain bit positions of register 14-184 with binary ZEROS, red error signals BSREDL010 and BSREDR010 can be forced to binary ONES. As seen from FIG. 4b, this enables checking circuits of memory subsystem 16 which are identical to those of block 14-10 to force bus data parity OK signal BSDPOK010 to a binary ONE when one or more data parts of the memory request were detected to contain an error. In this case, the integrity bits of the data parts remain unchanged allowing examination of test results.

Similarly, when memory subsystem 16 forces one or both of the red error signals BSREDL010 and BSREDR010 to binary ONES indicative of an uncorrectable error condition, the checking circuits 14-10 allow bus data parity OK signal BSDPOK010 to be forced to a binary ONE. This ensures compatibility with older systems as discussed herein.

As seen from FIG. 5a, a memory write request requires only one bus cycle of operation. However, a memory read request requires two bus cycles of operation. The first bus cycle is performed in the same manner for both memory read and memory write requests. During a subsequent second bus cycle, the memory subsystem 16 transfers the requested data to central subsystem 14. Here, memory subsystem 16 performs the sequence of operations of FIG. 4a. As seen from FIG. 5c, subsystem 16 applies the channel number of central subsystem 14, a constant value K and associated integrity bits to the address portion of system bus 12. The data and integrity bits are applied to the data portion of system bus 12 while the command and integrity bits are applied to the command portion of system bus 12. Also, the system response unit of memory subsystem 16 forces bus new parity line signal (e.g. MYNEWP010) and bus new address parity signal (MYNEWA010) to binary ONES.

The bus error control circuits of block 16-60 operate to force red error signals BSREDL010 and BSREDR010 to binary ONES upon detecting the presence of any uncorrectable errors within the different parts of the memory read requested data.

Now, central subsystem 14, as the receiving unit, (slave) performs the sequence of operations of FIG. 4b. Briefly, the integrity circuits of block 14-10 perform a check of each part of the information received from system bus 12 as a function of the states of bus new parity line BSNEWP, bus error exception signals BSREDL010 and BSREDR010 and bus new address line BSNEWA. As seen from FIG. 3b, in the absence of bus data parity OK signal BSDPOK010, bus command parity OK signal BSCPOK010 or bus address parity OK signal BSAPOK010 being forced to a binary ONE, the response circuits of block 14-12 are inhibited from generating a response. As previously discussed, this causes the timeout circuits of block 20 to generate a negative acknowledgement signal. As seen from FIG. 4b, this causes memory subsystem 16 to retry the same transfer of information during a subsequent cycle of operation. If the retry is successful, the central subsystem response circuits of block 14-12 are operative to generate an acknowledgement signal indicating acceptance which completes the memory operation. The acknowledgement signal causes the request to be stored in an input register (e.g. FIFO, buffer, queue).

When the retry is unsuccessful, the memory subsystem 16 operates to signal the occurrence of an uncorrectable error condition via system bus 12 or by other conventional means. It will be noted that for ease of implementation and design simplicity, the retry circuits of block 14-186 will retry all requests issued by CPU area 14-2 which result in the receipt of a negative acknowledgement response.

FIGS. 5d and 5e illustrate the formats of an I/O read request and I/O read request response. This type of request and response is processed by a peripheral subsystem in the same manner as the memory read request was processed by memory subsystem 16. The function code is used to specify the particular I/O operation to be performed. It is presumed that the peripheral subsystem is constructed to include the integrity checking and retry apparatus of the present invention.

FIG. 5f illustrates the format of an interrupt request. A subsystem desiring to interrupt the central subsystem 14 requests a bus cycle. When the bus cycle is granted, the subsystem places the channel number of central subsystem 14 on the address portion of system bus 12 and its own channel number and level number on the data portion of system bus 12. That is, the interrupting subsystem performs the series of operations of FIG. 4a while central subsystem 14 performs the series of operations of FIG. 4b.

In the same manner as previously described, the central subsystem integrity checking circuits of block 14-10 operate to verify all of the specified parts of the interrupt request. When so verified, bus data parity OK signal BSDPOK010, bus command parity OK signal BSCPOK010 and bus address parity OK signal BSAPOK010 are forced to binary ONES. As seen from FIG. 3b, this enables register 14-170 to be loaded with the states of signals PRSHBA010, PRINTA010 and PRINTN010. Since this is an interrupt request, second half bus cycle acknowledgement signal PRSHBA010 is a binary ZERO. The central subsystem 14 accepts the interrupt request by forcing interrupt acknowledge signal PRINTA010 to a binary ONE when the level number presented by the interrupting subsystem is numerically smaller than the current internal level. However, when the present level number is not numerically smaller than the current internal level, central subsystem indicates that it cannot accept the interrupt by forcing interrupt negative acknowledgement signal PRINTN010 to a binary ONE. As seen from FIG. 4a, in the absence of a response from central subsystem 14, the interrupting subsystem operates to retry the interrupt request. If retry is successful, operation continues. However, if retry is unsuccessful, the interrupting subsystem signals the error condition to the central subsystem 14.

As seen from FIG. 4b, the integrity checking circuits of the present invention also operate to process requests received from older subsystems which do not include the integrity checking features of the present invention. That is, when the request received and bus new parity signal BSNEWP010 and bus new address parity signal BSNEWA010 are binary ZEROS, the circuits of block 14-10 of FIG. 3a force bus command parity OK signal BSCPOK010 to a binary ONE and bus new address parity OK signal BSAPOK010 to a binary ONE notwithstanding the state of integrity signal BSAPEX010. The valid parity signals generated by parity generator circuits 14-108 and 14-116 in addition to the other such circuits are applied to the subsystem internal address paths. This provides added system integrity with essentially no additional circuits.

Summarizing the above, it is seen how subsystems which include the integrity checking bus and retry circuits of the present invention are able to determine at the earliest possible time whether or not a request has been properly received by a subsystem in a manner which is consistent with normal test procedures. Also, the invention provides for identical circuits within each subsystem reducing complexity and cost. By placing the burden of request verification on the unit initiating the request (master) or stated differently, the unit allocated the bus cycle, the system can reliably make such determinations and take the desired corrective action before any damage occurs. This provides a high degree of system resiliency while still maintaining a high degree of integrity. It will be noted that the same degree of integrity is employed in the handling of any type of bus request. Further, the master unit can establish which parts of a given request is required to be verified by a receiving unit prior to acceptance. By partitioning the different parts of a request, request verification is facilitated. This ensures the standardization of interface implementations within the system resulting in greater reliability and lower cost.

While the several examples described pertained to requests requiring one or two bus cycles, the invention operates in the same fashion in processing requests having any number of cycles (e.g. burst requests, double pull requests). Also, the present invention is in no way limited to any particular request format. For additional examples of formats, reference may be made to the publication entitled "Level 6 Minicomputers MODELS 6/34, 6/36 and 6/42", Order No. AS22, Rev. 3, dated May, 1979, Copyright 1979 Honeywell Information Systems Inc.

It will also be noted that for any system in which all subsystems include the integrity checking and retry circuits of the present invention, except for testing, there will be no need to include the bus new parity and bus new address parity lines. Also, many changes may be made to the integrity checking and response circuits of the present embodiment for accommodating different types of subsystems. The present embodiment is only illustrative of the type of circuits required for including the integrity and resiliency features of the present invention as part of a bus system of a processing system.

While in accordance with the provisions and statutes there has been illustrated and described the best form of the invention, certain changes may be made without departing from the spirit of the invention as set forth in the appended claims and that in some cases, certain features of the invention may be used to advantage without a corresponding use of other features.

What is claimed is:

1. A system including a plurality of units coupled in common to a system bus for transferring requests between said plurality of units during different bus cycles of operation, each request being transferred during a number of allocated bus cycles of operation, said system further including:
   means included in at least one of said plurality of units for generating requests on said bus, each request containing a number of different parts, said parts each containing a number of integrity bits for verifying when different parts of said request are validly received by another unit of said plurality of units designated by request during each of said number of allocated bus cycles of operation and at least one of said parts being coded to specify an operation to be performed by said another unit;
   checking means included in said another unit, said checking means being coupled to said bus for receiving and for verifying during each allocated bus cycle of operation that only those parts of said number of different parts of said each request designated by said one of said plurality of units received by said checking means of said another unit are valid;

response means included in said another unit, said response means being coupled to said checking means and to said bus, said response means being inhibited by said checking means from generating any response on said bus to said one unit during each allocated bus cycle of operation which signals the acceptance of said request when said checking means verifies that less than all of said designated parts of said received request are valid; and, means for accepting said request, said means for accepting being coupled to said bus and to said response means, said means for accepting being enabled to accept said request from said bus during each of said allocated bus cycles of operation upon said response means signalling said acceptance of said request and said means for accepting, rejecting said request applied to said bus during each of said allocated bus cycles of operation when said response means is inhibited from generating any response on said bus thereby ensuring that said another unit does not attempt to perform any operation specified by an invalid request.

2. The system of claim 1 wherein said system bus includes a plurality of function identification lines, each associated with at least one of said number of different parts of said each request, said function identification lines being set to states by said one of said plurality of units for designating those parts of said each request to be verified by said checking means of said another unit.

3. The system of claim 2 wherein each of said plurality of units include identical checking means which couple to said function identification lines of said system bus.

4. The system of claim 3 wherein said system bus further includes a number of exception lines for signalling the detection of uncorrectable error conditions, said number of said exception lines being coupled to each of said identical checking means, each of said identical checking means being conditioned by each of said number of exception lines to verify those predetermined parts of each request received from the unit associated therewith specified by the state of said each of said number of exception lines.

5. The system of claim 4 wherein said predetermined parts of said each request correspond to the data portion of said each request.

6. The system of claim 1 wherein said system further includes timeout means coupled to said system bus, said timeout means in the absence of any response from said another unit generating a predetermined signal on said bus after a predetermined period of time indicating that said another unit has not accepted said request and said one unit further including retry means coupled to said system bus, said retry means in response to said signal causing said generating means to retry said request on said system bus during a subsequent bus cycle of operation.

7. The system of claim 6 wherein said one unit further includes indicator means coupled to said retry means, said retry means causing said indicator means in response to said predetermined signal from said bus to generate a first error signal to said one unit signifying the occurrence of a first retry operation.

8. The system of claim 7 wherein said one unit further includes error means coupled to said indicator means and retry means, said indicator means causing said error means in response to a second occurrence of said predetermined signal to generate a second error signal signifying that said first retry operation performed by said retry means was unsuccessful and that further processing of said request is to be aborted by said one unit.

9. The system of claim 1 wherein said system bus includes a plurality of lines which are divided into a plurality of sections, each section being arranged for receiving at least one predetermined part including at least one of said number of integrity bits of each said request during each of a number of bus cycles of operation.

10. The system of claim 1 wherein said plurality of sections include a multibit address bus section, a multibit data bus section and a multibit command bus section for receiving address, data and command bits respectively including said number of integrity bits of each request during each of said number of bus cycles of operation.

11. A system including a plurality of units of new and old designs coupled in common to a system bus for transferring requests between said plurality of units during different asynchronously generated bus cycles of operation, said system further including:

first means included in at least a first unit of said plurality of units for generating requests on said bus, each request containing a number of different parts, each of said parts containing at least one integrity bit for verifying that said request is validly received by a second unit of said plurality of units of said new design during an allocated bus cycle of operation;

said system bus including:
a bus new parity line coupled only to each of said units of new design;
a bus new address line coupled only to each of said units of said new design; and,
a number of exception lines coupled to each of said units of said new design and said old design;

second means included in said first unit of said new design for applying predetermined signals to said new parity line, to said new address line and to said number of exception lines for identifying to a second one of said plurality of units of said new design specified to receive said request which ones are to be verified of said number of parts of said request including integrity bits for verifying that all of said number of parts of said request are valid;

checking means included in each of said plurality of units of said new design, said checking means of each of said units of new design being coupled to said new parity line, to said new address line and to said number of exception lines, said checking means verifying as valid only those different parts of said request received from said bus by said checking means of said unit which are specified by said predetermined signals applied to said new parity line, said new address line and said number of exception lines by said first unit of said new design; and, response means included in each of said plurality of units of said new design, said response means being coupled to said checking means and to said bus, said response means of each of said units of said new design being inhibited by said checking means from generating any response on said bus to said first unit signifying acceptance of said request when less than those specified parts of said received request are valid.

12. The system of claim 11 wherein said checking means of each unit of said new design in the absence of each predetermined signal performs a checking operation on the remaining parts of said received request and said response means of said each unit of said new design being conditioned by said checking means as a result of such checking operation to generate a response to one of said units of said old design which transmitted said received request, said response being the same as that which would have been generated in a system which included only said units of said old design.

13. The system of claim 11 wherein said response means of each unit of said new design is conditioned by said checking means when all of those different parts of said received request specified by said predetermined signals are valid to generate a predetermined response to said first unit signalling that said request has been validly received.

14. The system of claim 13 wherein each of said units of said new design include connector means for applying said number of said integrity bits to said bus in a predetermined manner for enabling each of said units of said old design coupled to said bus to disregard said integrity bits and perform a check only on those parts of said received request which are verified in said system including only said units of said old design.

15. The system of claim 11 wherein said system further includes timeout means coupled to said system bus, said timeout means in the absence of any response from said another unit generating a predetermined signal on said bus after a predetermined period of time indicating that said another unit has not accepted said request and said one unit further including retry means coupled to said system bus, said retry means in response to said signal causing said generating means to retry said request on said system bus during a subsequent bus cycle of operation.

16. The system of claim 15 wherein said one unit further includes indicator means coupled to said retry means, said retry means causing said indicator means in response to said predetermined signal from said bus to generate a first error signal to said one unit signifying the occurrence of a first retry operation.

17. The system of claim 13 wherein said one unit further includes error means coupled to said indicator means and said retry means, said indicator means causing said error means in response to a second occurrence of said predetermined signal to generate a second error signal signifying that said first retry operation performed by said retry means was unsuccessful and that further processing of said request is to be aborted by said one unit.

18. The system of claim 11 wherein said system bus includes a plurality of lines which are divided into a plurality of sections, each section being arranged for receiving at least one predetermined part including at least one of said number of integrity bits of each of said request during each of a number of bus cycles of operation.

19. The system of claim 11 wherein said plurality of sections include a multibit address bus section, a multibit data bus section and a multibit command bus section for receiving address, data and command bits, respectively, including said number of integrity bits of each request during each of said number of bus cycles of operation.

20. The system of claim 12 wherein said checking means generates integrity bits for all of said parts of said received requests and each unit of said new design further including a number of internal paths and transfer means coupled to said internal paths, to said checking means to said new parity line, to said new address line and to said system bus, said transfer means being operative to transfer to said internal paths within said each unit of said new design, integrity bits generated by said checking means for those parts of said request received and accepted from said unit of said old design which did not contain integrity bits.

21. A method of operating a bus system in a resilient manner when transferring requests during different allocated bus cycles of operation between a plurality of data handling units coupled in common to said bus system, each request being transferred during a number of said allocated bus cycles of operation, said method comprising the steps of:
(a) partitioning each request into a number of different parts;
(b) generating requests on said bus system by means included in at least one of said units in which each part contains a number of integrity bits for verifying when said request is validly received by another unit of said plurality of units designated by said request during each of said number of allocated bus cycles of operation and at least one of said parts being coded to specify an operation to be performed by said another unit;
(c) generating signals on a number of function identification lines included in said bus system for specifying which ones of said number of different parts of said each request are to be verified during normal and testing operations during an allocated bus cycle of operation;
(d) checking by checking means included in at least another one of said data handling units only those different parts of said request designated by said number of function identification lines for verifying that said request received by said checking means of said another data handling unit during said each allocated bus cycle of operation is valid; and,
(e) generating a response on said bus by response means included in said another one of said units only when all of said designated parts of said request received during said each allocated bus cycle of operation are signalled by said checking means as being valid; and,
accepting said request from said bus during each allocated bus cycle of operation when a response is generated signalling the receipt of a valid request; and,
rejecting the request applied to said bus during each allocated bus cycle of operation when no response is generated signalling the receipt of an invalid request thereby ensuring that said another one of said data handling units does not attempt to perform any operation specified by an invalid request.

22. The method of claim 21 wherein said method further includes the steps of:
(f) generating a signal by timeout means connected to said bus system in the absence of said response for signalling to the unit which transmitted a request, the occurrence of a bad bus cycle of operation in which the intended receiving unit had not accepted the request because it was invalid; and, (g) retrying said request on said bus system during another allocated bus cycle of operation by retry means including within such transmitting unit.

23. The method of claim 21 wherein said step of generating signals on a number of said function identification lines includes the steps of:

generating predetermined signals on a new parity line and a new address line included in said bus system when said data handling units include units of old and new designs; and, applying said predetermined signals on said new parity line and said new address line only as inputs to the checking means of each unit of a new design.

24. The method of claim 21 wherein said method further includes the step of assigning said one and said another one of said data handling units the same channel number for enabling said unit to transfer requests to itself in said resilient manner.

* * * * *